July 20, 1943.   V. J. RUGGIERO   2,324,597
COFFEE CAN FILLING MACHINE FUNNEL
Filed Dec. 18, 1941   3 Sheets-Sheet 1

Inventor
VINCENT J. RUGGIERO,
By Clarence A. O'Brien
Attorney

July 20, 1943. V. J. RUGGIERO 2,324,597
COFFEE CAN FILLING MACHINE FUNNEL
Filed Dec. 18, 1941  3 Sheets—Sheet 3

Inventor
VINCENT J. RUGGIERO,
By Clarence A. O'Brien
Attorney

Patented July 20, 1943

2,324,597

UNITED STATES PATENT OFFICE 2,324,597

COFFEE CAN FILLING MACHINE FUNNEL

Vincent J. Ruggiero, North Bergen, N. J.

Application December 18, 1941, Serial No. 423,530

1 Claim. (Cl. 226—31)

The present invention relates to new and useful improvements in coffee can filling machines, and has for its primary object to provide, in a manner as hereinafter set forth, an apparatus of this character comprising funnels of a novel construction whereby the machine may be cleaned while it is in operation without danger of the worker being injured.

Another very important object of the invention is to provide a resilient funnel for coffee can filling machines which includes an integral spreader of unique construction.

Other objects of the invention are to provide a filling machine of the character described which will be comparatively simple in construction, strong, durable, highly efficient and reliable in use, compact and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein.

Figure 1:
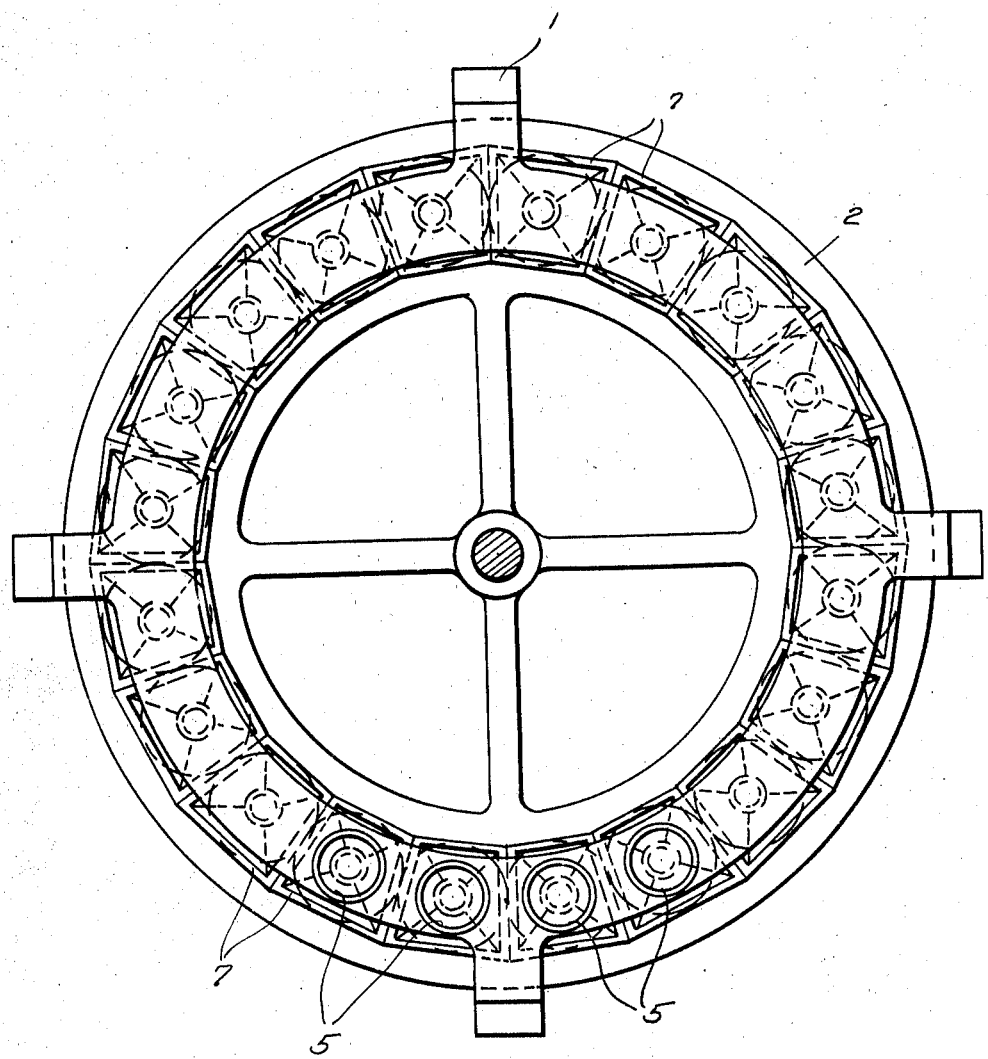
Figure 1 is a top plan view of a portion of a coffee can filling apparatus comprising funnels constructed in accordance with the present invention.
Figure 2:
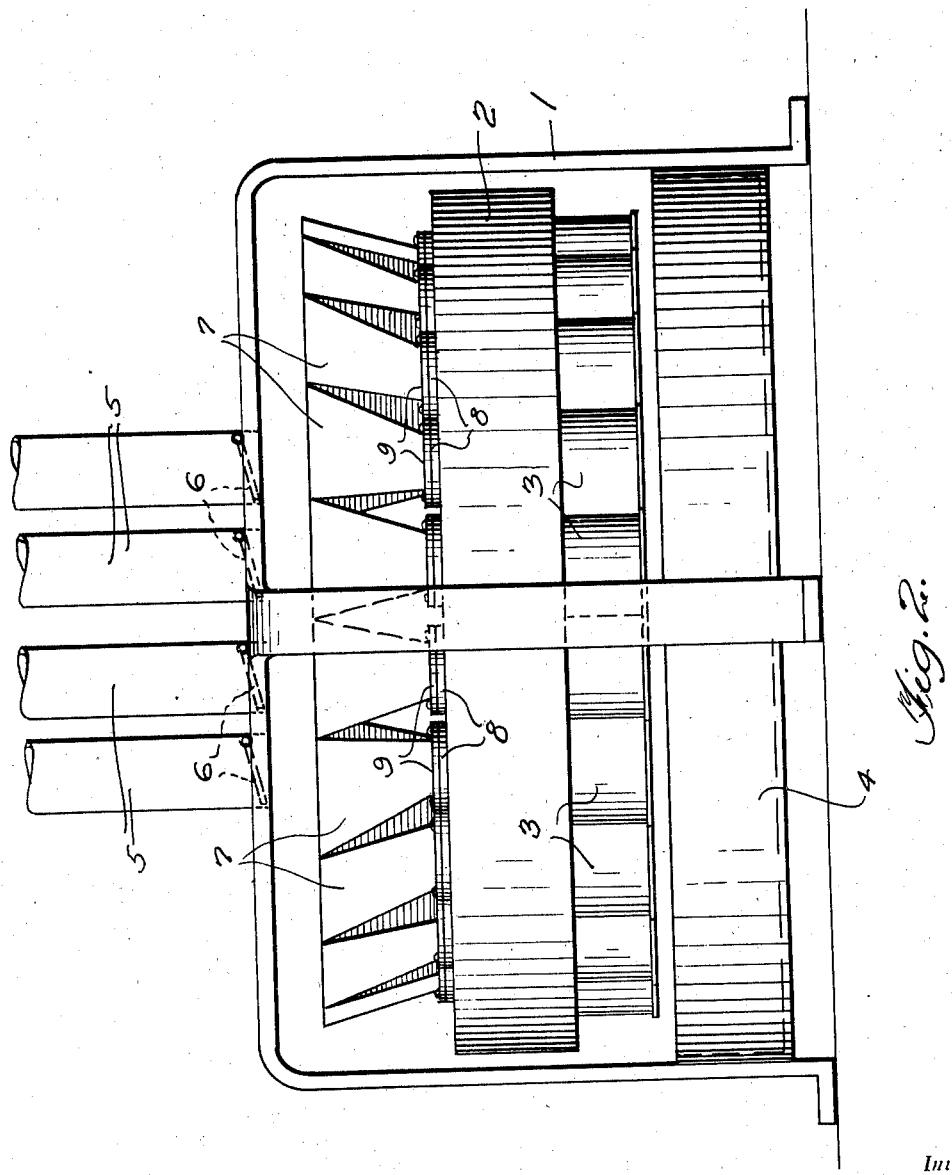
Figure 2 is a view in side elevation thereof.

Referring now to the drawings in detail, it will be seen that reference numeral 1 designates a frame structure. Rotatable in a horizontal plane in the frame structure 1 is a circular carrier or conveyor 2. The conveyor 2 supports the cans 3 to be filled. A suitable conveyor (not shown) supplies the cans 3 to the rotary conveyor 2. Mounted beneath the rotary conveyor 2 is a coffee catch pan 4.

Figures 3, 4:
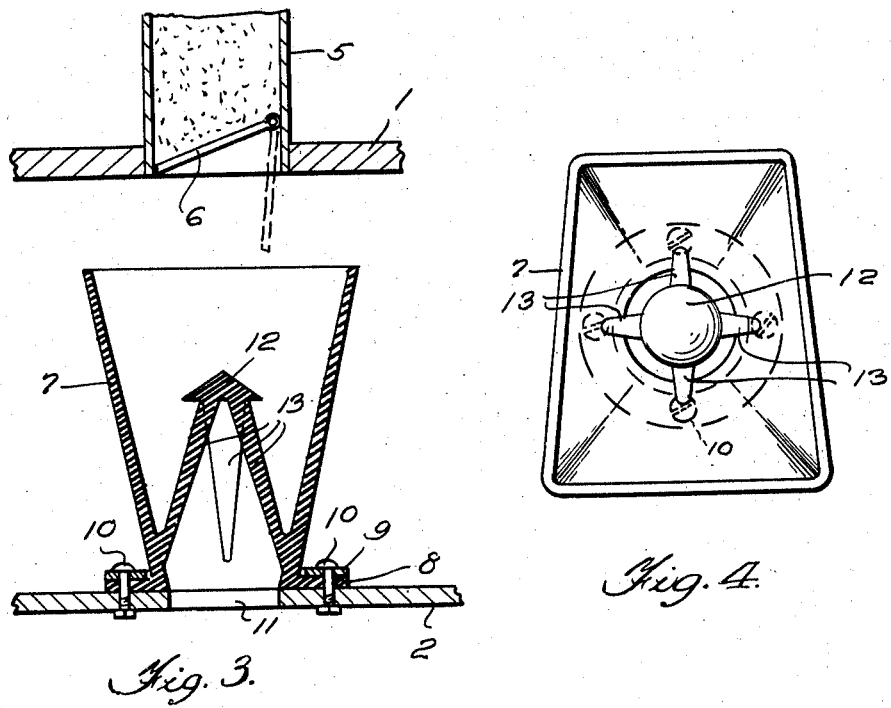
Figure 3 is a vertical sectional view through one of the resilient funnels.
Figure 4 is a top plan view of one of the resilient funnels.

Mounted above the frame structure 1 is a plurality of scale pipes 5. Automatic valves 6 (see Fig. 3) control the discharge of the coffee from the pipes 5. As indicated in dotted lines, the valves 6 swing downwardly to open position when the coffee in the pipes 5 reaches a predetermined weight.

Figure 5:
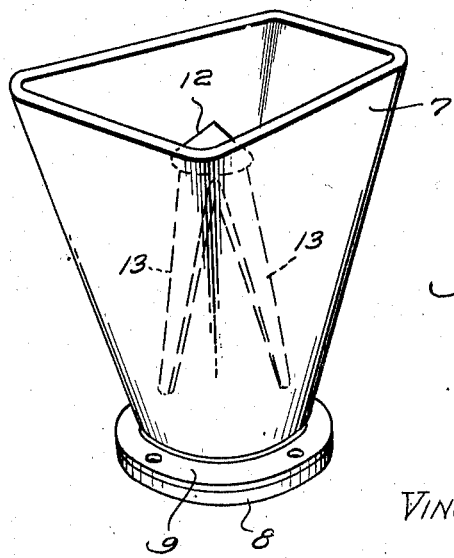
Figure 5 is a perspective view of one of the resilient funnels.

The coffee from the pipes 5 is discharged into the cans 3 on the rotary conveyor 2. Toward this end, funnels 7 are mounted on the rotary conveyor 2 above the cans 3. The funnels 7 are of resilient rubber and are of the shape shown to advantage in Figures 4 and 5 of the drawings.

The resilient funnels 7 include integral, outturned flanges 8 on their lower ends which rest on the rotary conveyor 2. Metallic rings 9 are mounted on the flanges 8. Then, bolts 10 pass through the rings 9 and the flanges 8 for securing the resilient funnels 7 in position on the rotary conveyor 2.

The coffee from the resilient funnels 7 passes downwardly through openings 11 in the top of the rotary conveyor 2 into the cans 3.

The resilient funnels 7 further include integral spreaders 12. The spreaders 12 are substantially conical and include downwardly diverging supporting legs 13 which join the funnels 7 adjacent the lower ends thereof.

It is thought that the manner in which the invention functions will be readily apparent from a consideration of the foregoing. Briefly, the resilient funnels 7 rotate with the conveyor 2, passing beneath the valve controlled pipes 5. As usual, a funnel is provided above each of the cans 3 on the rotary conveyor 2. The coffee from the scale pipes 5 enters the funnels 7 which are positioned therebeneath and, after being uniformly distributed by the spreaders 12, passes downwardly through the openings 11 into those cans 3 which are in position to be filled. The resilient funnels 7 permit cleaning and other work to be done on the machine while it is in motion without danger of the worker being injured by getting his or her arms, for example, between the members of the frame structure 1 and the funnels as said funnels pass said frame members.

It is believed that the many advantages of a coffee can filling machine comprising the present invention will be readily understood, and although a preferred embodiment is as illustrated and described, it is to be understood that changes in the details of construction may be resorted to which will fall within the scope of the invention as claimed.

What is claimed is:

A coffee can filling machine funnel comprising a substantially tapered, resilient body of polygonal horizontal section having an outlet in its lower portion, an integral external flange on the lower end of the body, a ring on said flange, means extending through the ring and flange for securing the body on a support, upwardly converging legs in the body, said legs being integral with said body and extending upwardly from points adjacent the outlet thereof, and a substantially conical spreader integral with the upper ends of said legs.

VINCENT J. RUGGIERO.